United States Patent [19]
Mast

[11] Patent Number: 5,928,097
[45] Date of Patent: Jul. 27, 1999

[54] ADJUSTABLE TENSION IDLER PULLEY AND BELT

[75] Inventor: John W. Mast, Medina, Ohio

[73] Assignee: Commercial Turf Products, Ltd., Streetsboro, Ohio

[21] Appl. No.: 08/966,085

[22] Filed: Nov. 7, 1997

[51] Int. Cl.[6] .................................................. F16H 7/12
[52] U.S. Cl. ............................................................ 474/133
[58] Field of Search .................................. 474/109, 113, 474/117, 118, 133, 143, 150; 56/11.6

[56] References Cited

U.S. PATENT DOCUMENTS

| | | | |
|---|---|---|---|
| 1,387,445 | 8/1921 | Anderson | 474/133 |
| 4,102,114 | 7/1978 | Estes et al. | 56/15.2 |
| 4,132,280 | 1/1979 | Jones et al. | 180/19 |
| 4,530,682 | 7/1985 | Gruber et al. | 474/133 |
| 5,236,397 | 8/1993 | Green | 474/105 |
| 5,240,461 | 8/1993 | Hohnl | 474/101 |
| 5,343,678 | 9/1994 | Stuart | 56/11.6 |

*Primary Examiner*—John A. Jeffrey
*Assistant Examiner*—Chong H. Kim
*Attorney, Agent, or Firm*—Emerson & Associates; Roger D. Emerson; John M. Skeriotis

[57] ABSTRACT

A belt-tensioning device for a walk-behind mower with driven wheels is disclosed. The belt-tensioning device allows the operator a hands-free way to increase the idler pulley force and hence, tension of the driven belt. The device includes a belt guard, a spring adjuster assembly comprising a spring adjuster arm and a spring adjuster footstep. The operator increases the tension of the driven belt by using the footstep that is located on the device attached to the spring adjuster arm. This moves the pulley by way of a spring attached to the pulley and the belt guard. Movement of the spring increases the belt tension.

15 Claims, 12 Drawing Sheets

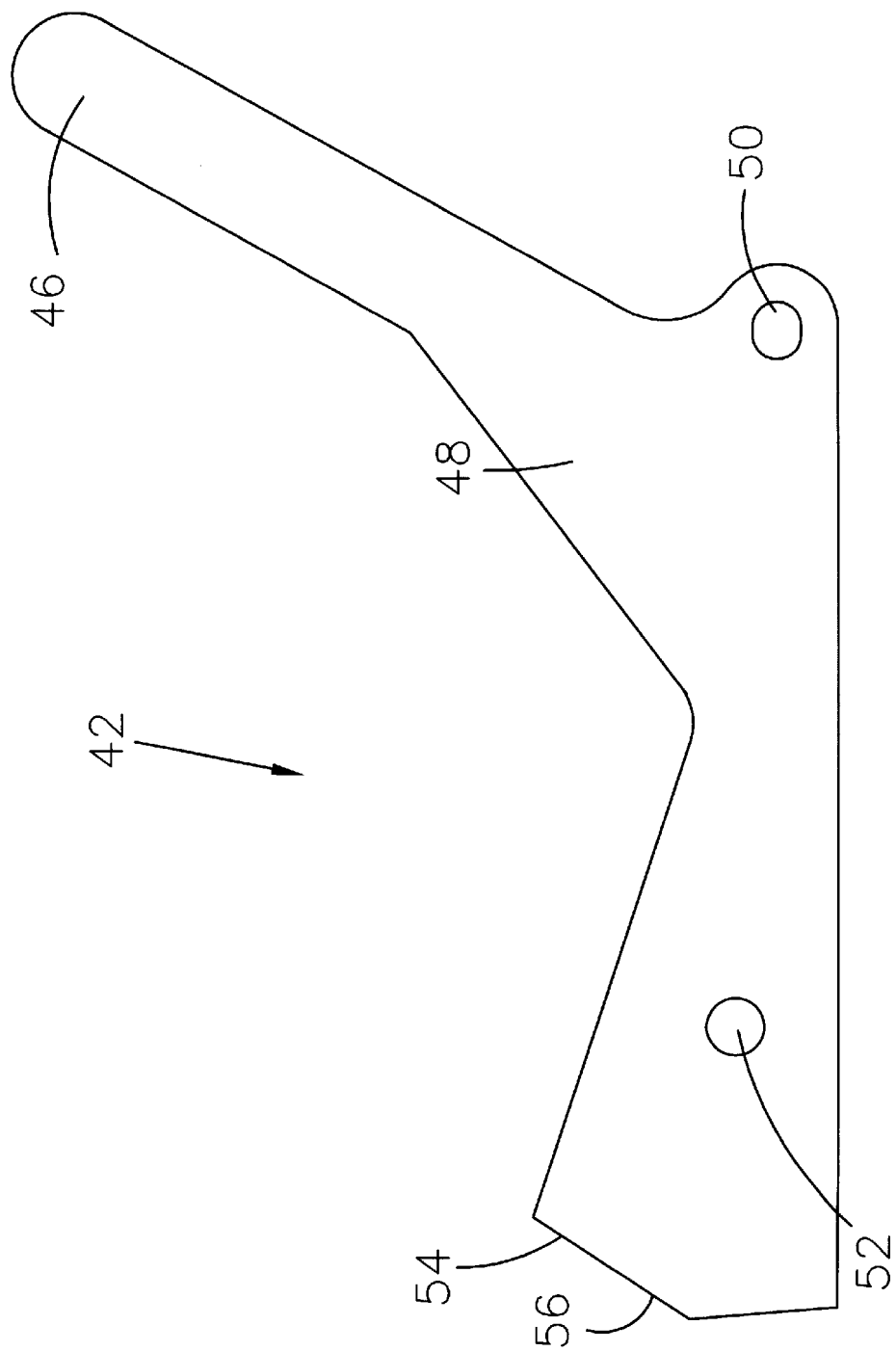

ADJUSTABLE TENSION IDLER PULLEY AND BELT

BACKGROUND OF THE INVENTION

1. Field of the Invention

The present invention relates to an adjustable tensioning mechanism and more particularly, to an adjustable force idler pulley and belt mechanism for increasing the tension of a drive belt used in attachment with a lawn mower.

While the present invention can be used in a wide variety of belt-driven applications, the invention will be described primarily with its application as a foot adjustable tensioning mechanism for use with a commercial walk-behind mower.

2. Description of the Related Art

The present invention contemplates a new and improved adjustable force idler pulley and belt which is simple in design, effective in use, and overcomes the following difficulties and others while providing better and more advantageous overall results.

Motor vehicles have used drive belts in association with pulleys as a well known means of transferring power from a central drive unit. Typically, the power is transferred from a central power unit along several pulleys and drive belts. In lawn mowers the central drive unit is the engine which transmits power to the drive wheels and to the cutter assembly.

Belts are used in many household, automotive and industrial applications as a power transmission element. In the present invention a belt is used to transmit power from a motor to a drive mechanism of a walk-behind lawn mower. Typically a power transmission belt is wrapped around a driver pulley and a driven pulley.

One disadvantage of using drive belts is that they tend to stretch under constant tensile forces. Over time this results in a lengthening of the belt and a corresponding reduction of power transferred. Traditionally, these belts are prevented from dislocation or slippage relative to a pulley by belt guards and the tension of the belt. The idler pulley is spring-loaded in a direction transverse to the rotating belt. This arrangement increases the tension on the belt to prevent the belt from slipping and being thrown off the belt wheel. However, when the belt slackens it undergoes excessive wear due to slippage and can fall off the pulley under this traditional idler pulley system. Drive belts require constant monitoring with means available to readily and efficiently adjust belt tension.

Another disadvantage of using drive belts is that they tend to slip when becoming wet such as when the mower is used in rainy or dew conditions. This slippage due to rainy conditions compounds the previously described problems of slippage due to wear. The combination of slippage due to wear and slippage due to wet conditions further diminishes the use of the belt and the ability to use the mower in various conditions.

When using a walk-behind mower in rough conditions, the operator typically needs to increase the power to the driven wheels. Often, the mower gets stuck in rough or uphill conditions requiring more power to be supplied to the driven wheels than is available. In such cases the operator has to push or pull the mower from the entrapped area. The drive belt slips or otherwise cannot provide the driven wheels of the mower the required force to move.

In a walk-behind mower, the operator traditionally controls movement of the mower by hand control levers located on the right and left side of the mower. Other means to increase the belt tension have included the operator to push or pull a device located outside of the operators handle bars having the motion control hand levers. In order to increase the tension between the belt and the pulley the operator must remove one hand from the handlebars and pull a traction/tensioning device to increase the belt tension.

Other known belt tensioning adjustment mechanisms can be cumbersome, difficult to operate and may require hand tools to change or adjust.

SUMMARY OF THE INVENTION

In accordance with the present invention, a new and improved adjustable belt tensioning device is provided which allows the operator to increase the tension within a belt by using their foot.

Disclosed is an adjustable tensioning device for use with a walk-behind mower that has a frame. The adjustable tensioning device has a bellcrank bracket that is pivotally mounted to the frame of the lawn mower. A belt rides within three pulleys, namely a drive, driven, and an idler pulley. The idler pulley mounts to the bellcrank bracket by a mounting means. The idler pulley exerts a force upon the belt.

The adjustable tensioning device further comprises a belt guard. The belt guard has a slotted portion and a slotted hole. The slotted portion has an first side and an second side. The slotted portion of the belt guard has grooves along the first side.

A spring position adjuster assembly has an arm and a footstep. The spring position adjuster arm is pivotally mounted to the belt guard through the slotted hole. An engaging means engages the spring position adjuster arm with the slotted portion of the belt guard. The spring position adjuster arm and the footstep can also be an integral piece. The engaging means typically comprises a bolt that is able to move within the slotted portion of the belt guard, the bolt able to seat within the grooves of the belt guard. A spring has its first end attached to the spring position adjuster arm. The second end of the spring is attached to the mounting means. The spring position adjuster arm can move upwardly and downwardly.

Movement of the spring position adjuster assembly in the downward direction increases the force of the idler pulley and increases the tension of the belt. The tension of the belt is increased due to an increase in a force on the idler pulley. The preferred embodiment of the spring position adjuster arm has a lever wherein movement of the lever in the rearward direction increases the tension of the belt. Movement of the lever in the rearward direction increases the force of the idler pulley and increases the tension of the belt.

One object of the present invention is to allow the operator to increase the belt tension without removing one of their hands from the handlebars.

Another object of the present invention is to allow the operator to increase the tension within the driven belt by using their foot.

Another object of the present invention is to allow the operator to lengthen the time a drive belt can be used before replacement.

Another object of the present invention is to allow the operator to increase power to the driven wheels and thereby to move the mower when stuck in wet areas.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein:

FIG. 8 is a front view of the spring adjuster arm;

FIG. 9 is a side view of the spring adjuster arm;

DESCRIPTION OF THE PREFERRED EMBODIMENT

Figure 1:
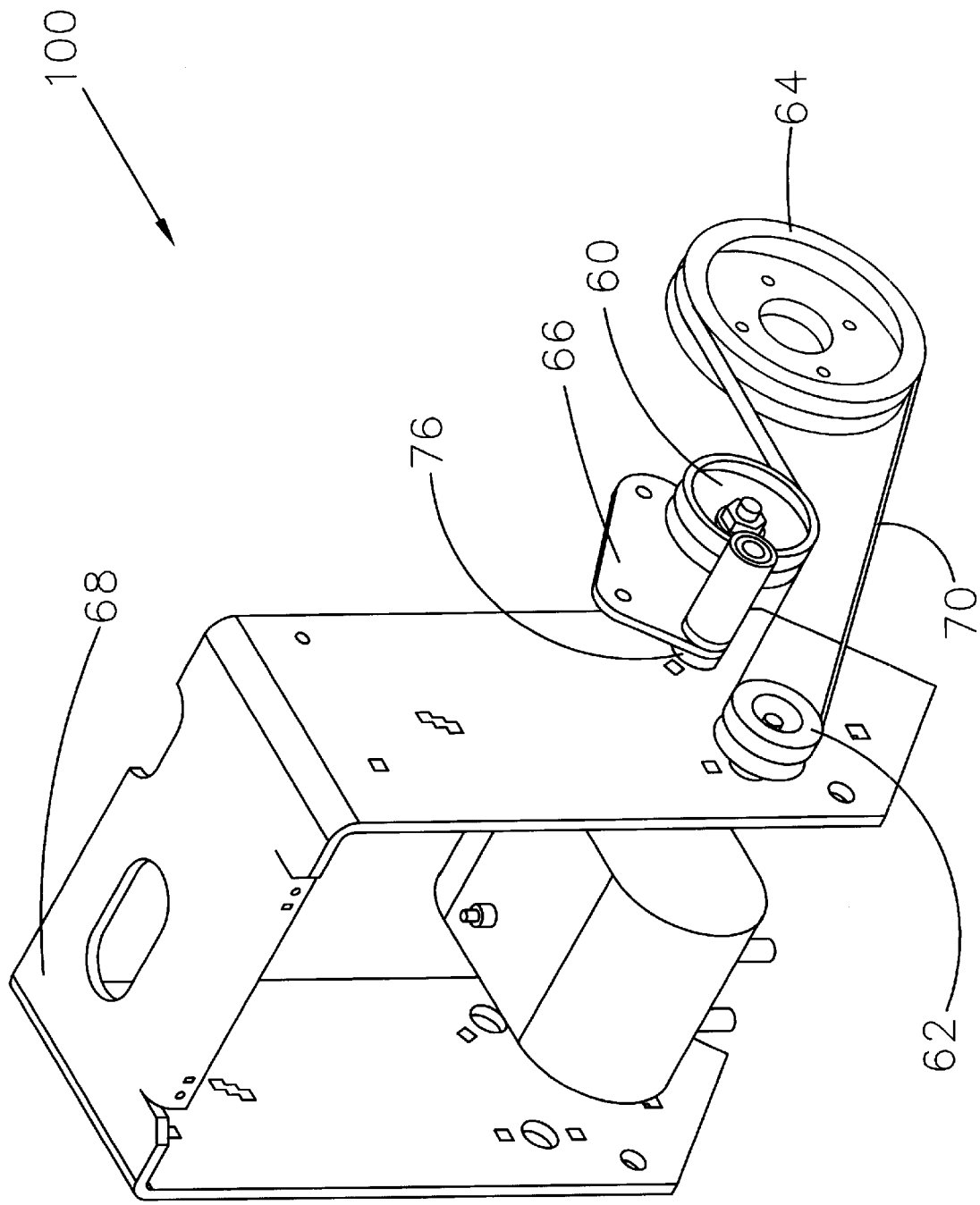
FIG. 1 is a perspective view of a belt drive system for transmitting power from the transmission to the wheels.
Figure 15:
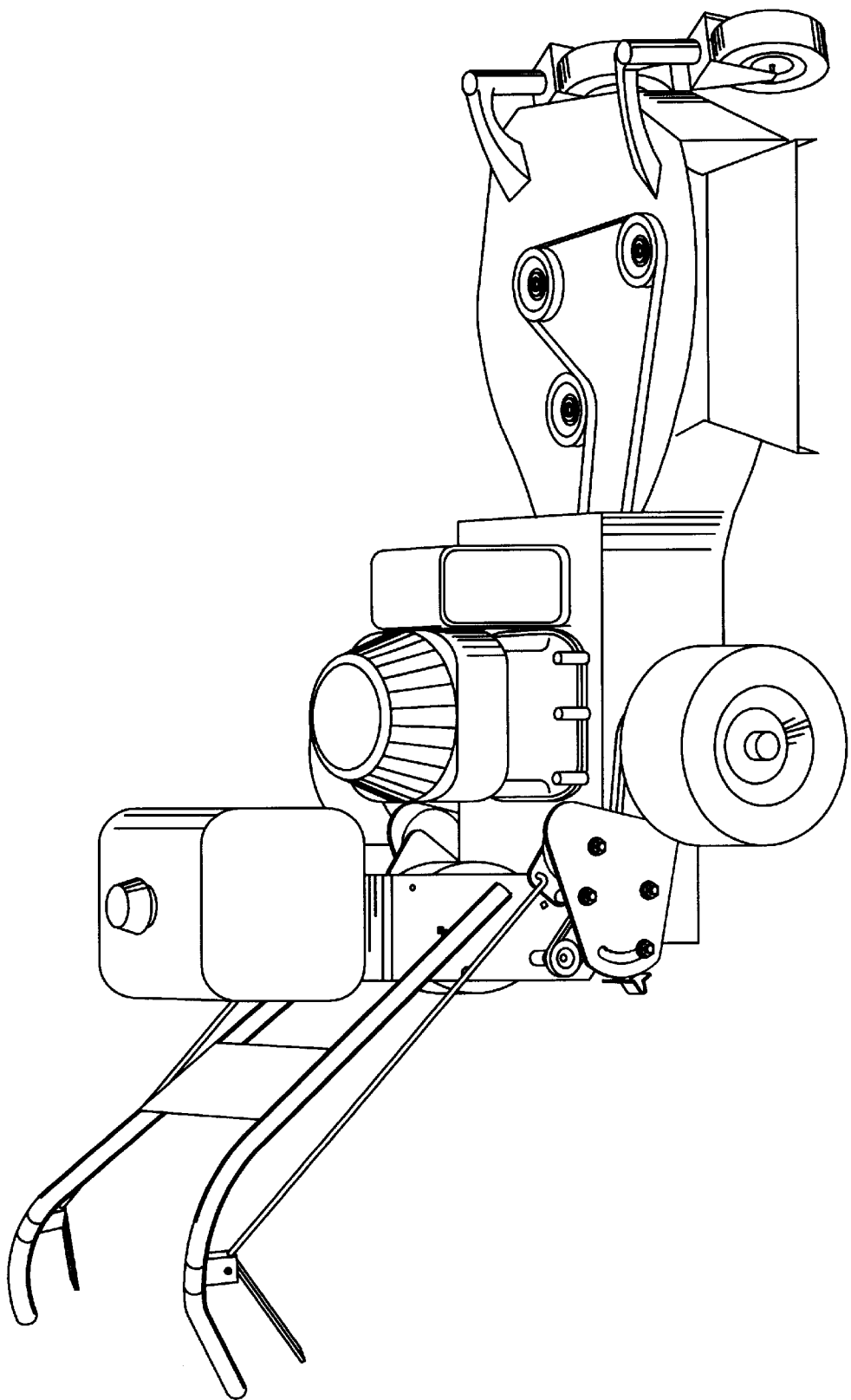
FIG. 15 shows the current invention in combination with a walk-behind lawnmower

Referring now to the drawings which are for purposes of illustrating a preferred embodiment of the invention only and not for purposes of limiting the same, FIG. 1 shows a belt drive system 100. The belt drive system 100 is used for transmitting power from the transmission 110 of the mower to the wheels (not shown) of a mower. The belt drive system 100 includes three pulleys. The three pulleys are an idler pulley 60, a drive pulley 62, and a driven pulley 64. The driven pulley 64 is mounted on a drive wheel (not shown). The idler pulley 60 is mounted on a bellcrank bracket 66 that pivots on the mower frame 68. Preferably, the idler pulley 60 is an outside, slack side idler pulley. FIG. 15 shows the current invention in combination with a walk-behind lawnmower 111.

Figure 2:
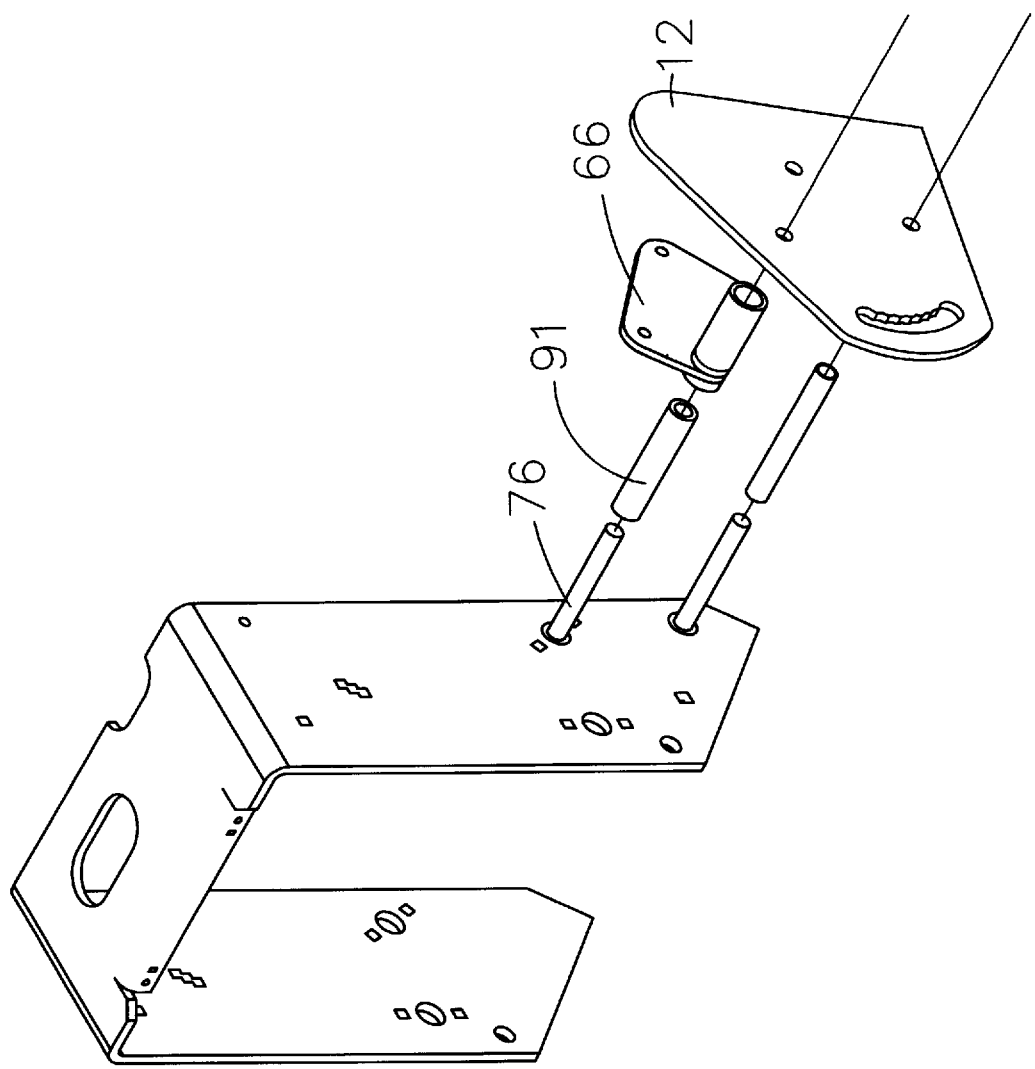
FIG. 2 is a perspective view of a belt guard mounted to a bellcrank bracket of the present invention.

With reference to FIGS. 1 and 2, the idler pulley 60 is mounted to the bellcrank bracket 66 through a hex bolt 90, to which a spring 30 will also be attached. A washer 102 is seated behind hex bolt 90. The hex bolt 90 preferably seats within a pivot spacer 91 which is clamped to the frame by the clamping force of the bolt 90. The bellcrank bracket 66 pivots over the spacer 91. The bellcrank bracket 66 is pivotally mounted to the frame 68 by bolt 90.

Figure 3:
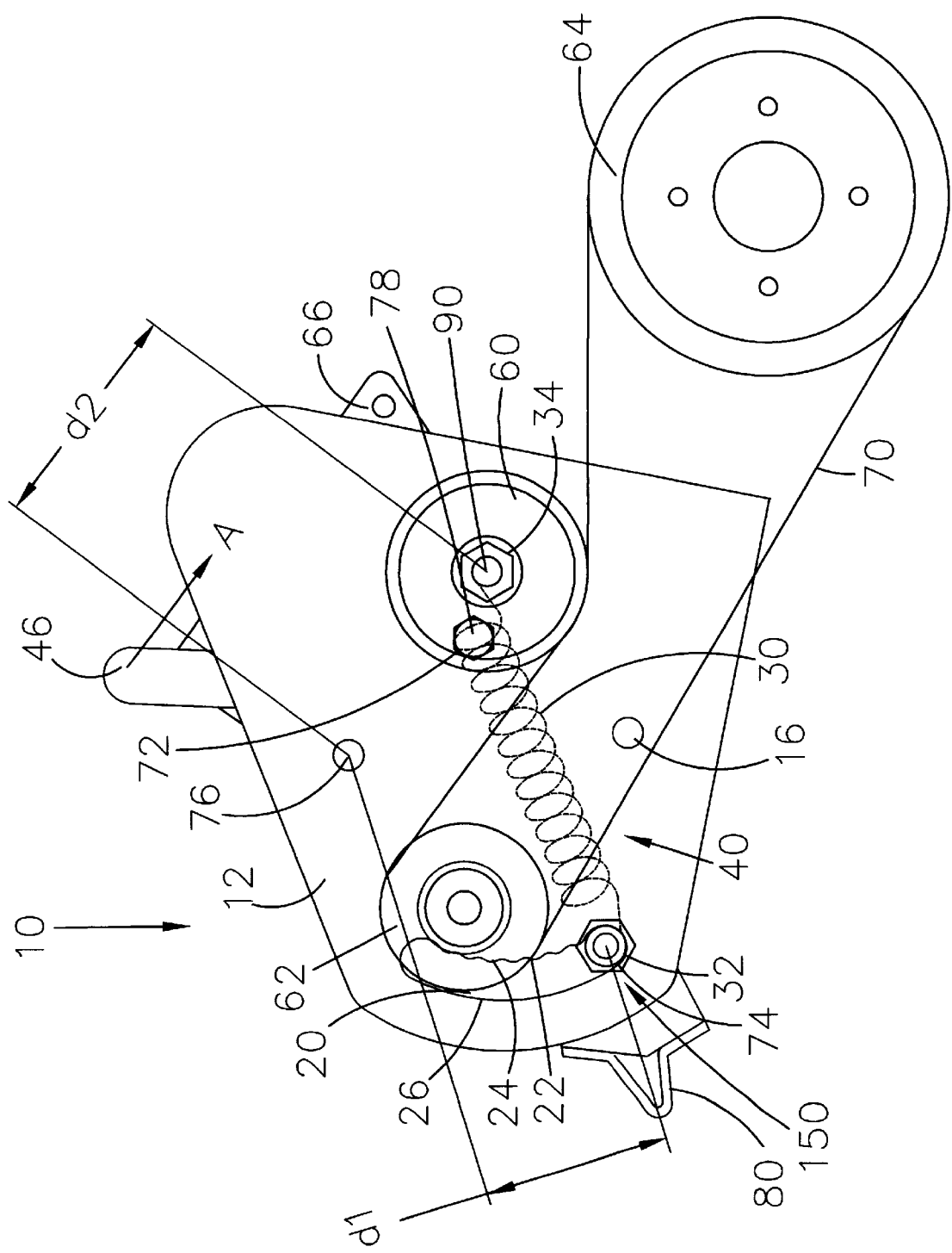
FIG. 3 shows the adjustable belt tensioning device of the present invention.
Figure 6:
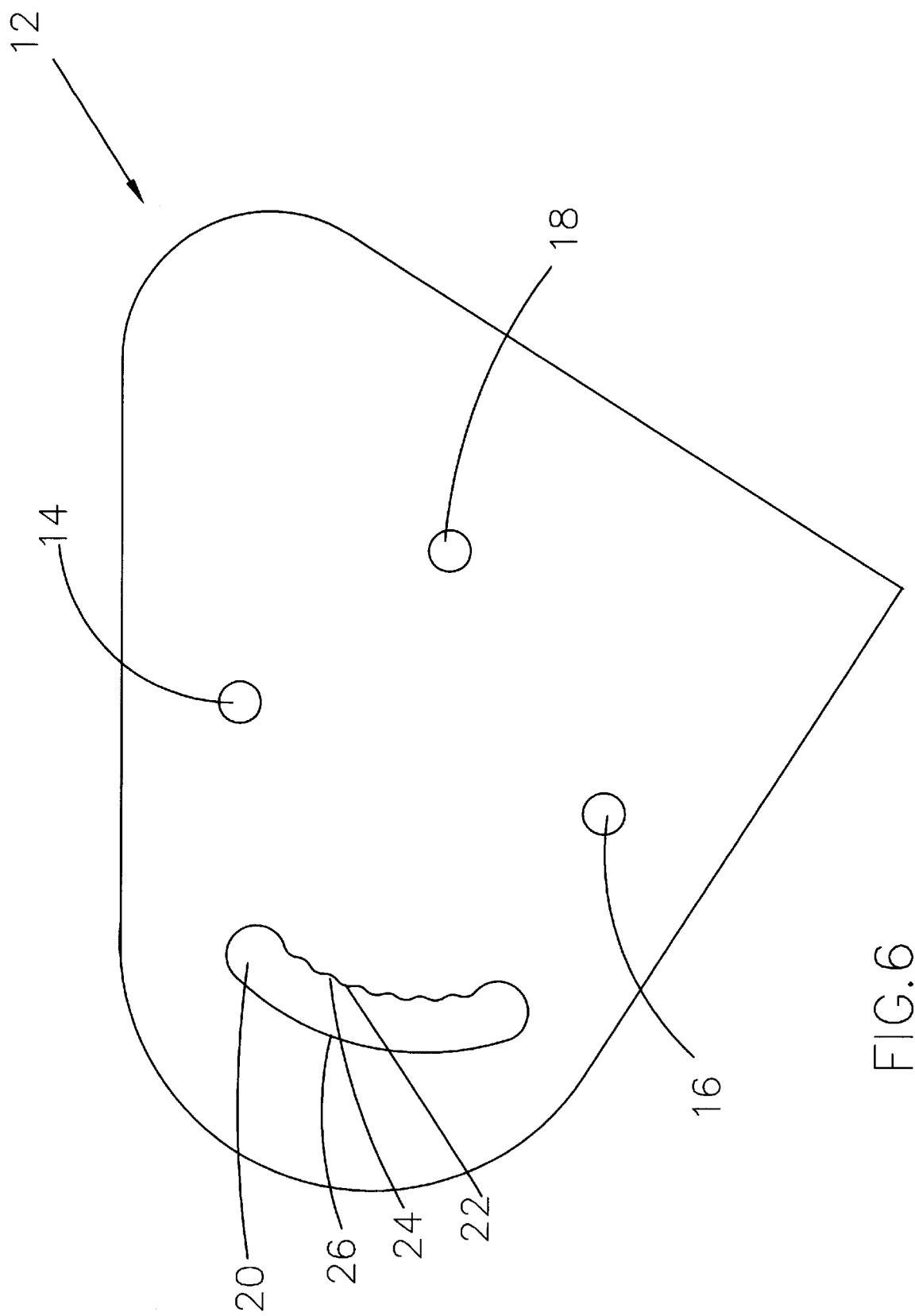
FIG. 6 is a front view of the belt guard.
Figure 7:
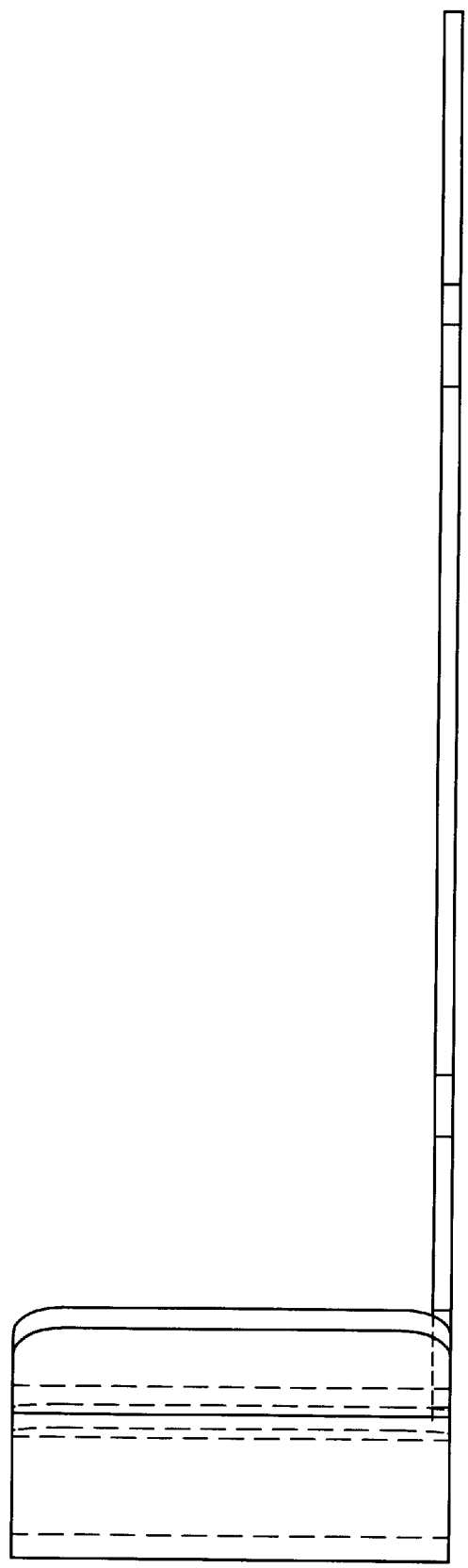
FIG. 7 is a top view of the spring position adjuster assembly.

With reference to FIGS. 3 and 6, the adjustable belt-tensioning device 10 has a belt guard 12, a spring 30, and a spring position adjuster assembly 40. According to the preferred embodiment, the belt guard 12 mounts to the mower frame 68 by way of mounting holes 14, 16. The belt guard 12 can be mounted in a variety of ways to the mower frame 68 that are well-known within the art. Attachment hole 18 connects the belt guard 12 with the spring position adjuster assembly 40.

Figure 14:
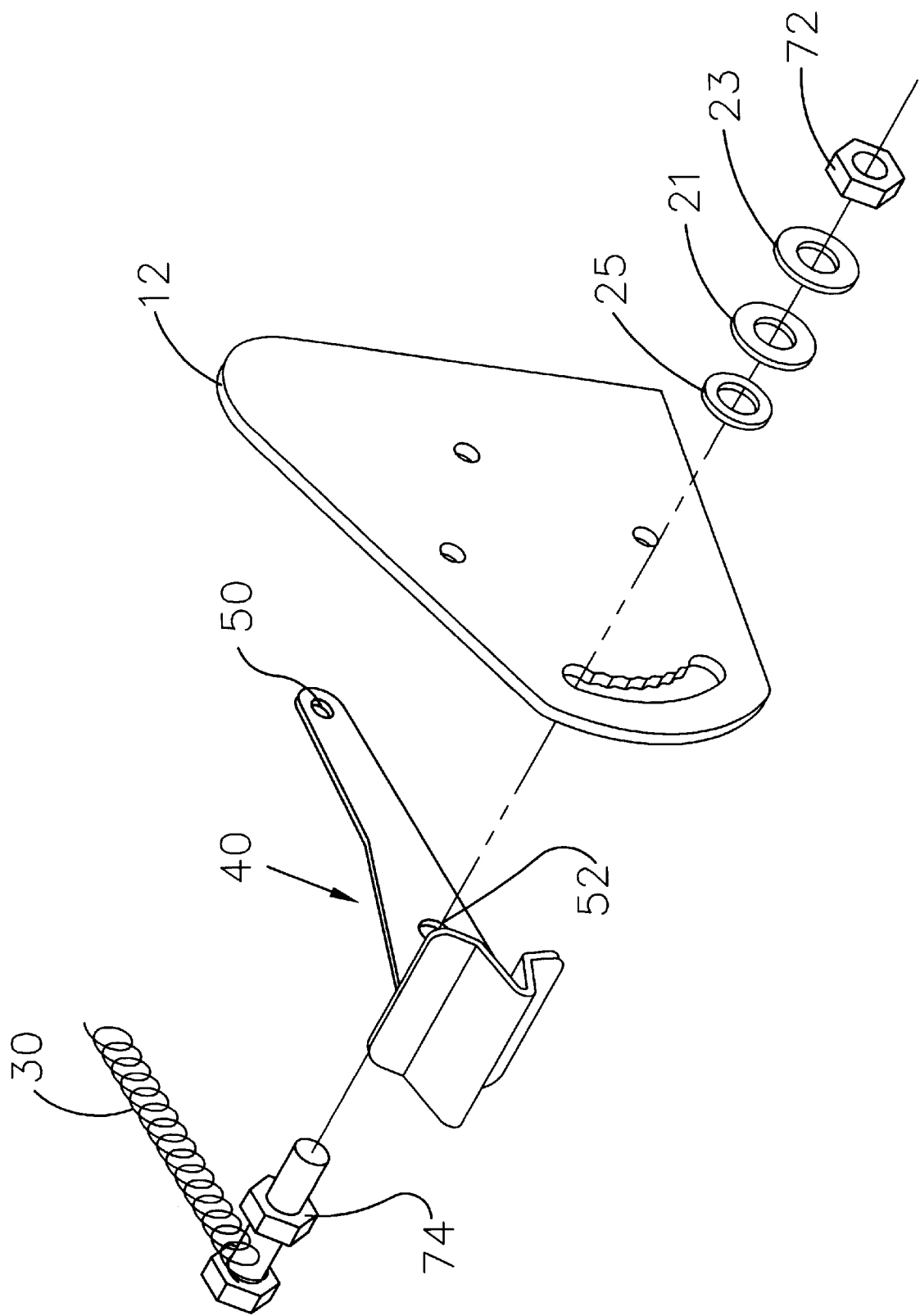
FIG. 14 shows the spring position adjuster assembly assembled to the belt guard.

As shown in FIG. 14, the spring position adjuster assembly 40 is pivotably mounted to the belt guard 12 with a shoulder nut 72 which allows the spring position adjuster assembly 40 to pivot freely while still being attached to the belt guard 12. While the shoulder nut 72 is used in the preferred embodiment, any mounting means which would allow the spring position adjuster assembly 40 to pivot is within the scope of this invention.

With reference to FIG. 6, the belt guard 12 also has a slotted arcuate portion 20. The slotted arcuate portion 20 has radiused grooves 22 along its first side 24, while its second side 26 is essentially a smooth arcuate edge. Engaging means 150 engages the spring position adjuster arm 42 with the slotted portion 20 of the belt guard 12. In its preferred embodiment, shown in FIGS. 3 and 14, the engaging means 150 comprises a bolt 74 is within the slotted arcuate portion 20. The bolt 74 is a first attaching means for the spring 30 at its first end 32. The bolt 74 is also attached to the spring position adjuster arm 42. The belt guard 12 is essentially cam-shaped. The belt guard 12 is configured in order to cover the drive pulley 62. The belt guard 12 covers a belt 70 and provides a pivotally attaching point for the spring position adjuster assembly 40. Other configurations and/or engaging means other than the bolt 74 which function similarly are within the scope of this invention. The belt guard 12 also protects a portion of the pulley 60, the belt 70 and the spring position adjuster assembly 40 from debris such as grass, stones, etc. which can come into contact while the mower is in operation. The belt guard 12 has additional functions and works in cooperation with the spring adjuster assembly 40, the pulley 60 and the belt 70.

Figure 5:
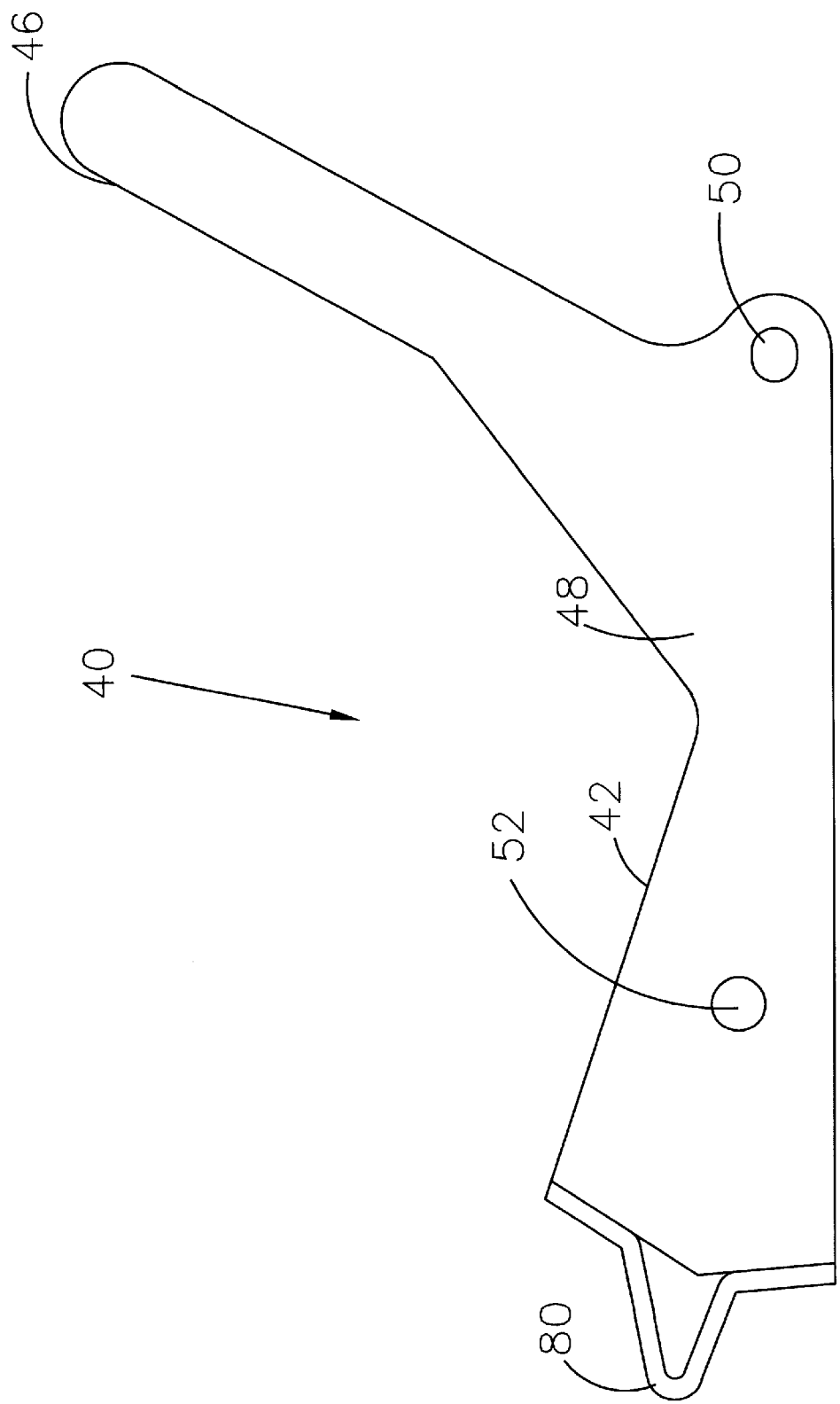
FIG. 5 is a front view of the spring position adjuster assembly.

As shown in FIG. 5, the spring position adjuster assembly 40 comprises a spring position adjuster arm 42 and a spring position adjuster footstep 80. FIG. 5 shows the preferred spring position adjuster arm 42. The adjuster arm 42 has a lever 46 at its one end that extends into its body portion 48. The adjuster arm 42 has a slotted hole 50, and a round hole 52. The slotted hole 50 is aligned with the attachment hole 18 of the belt guard 12. The slotted hole 50 is preferably attached to the attachment hole 18 by way of a shoulder nut 72, washers (not shown), and cap screw 78. The adjuster arm 42 is able to rotate about the shoulder portion of the nut 72 and to move radially within the slotted hole 50 when the spring position adjuster assembly 40 moves angularly within the slotted accurate portion 20. The adjuster arm 42 is able to pivot freely while still being attached to the belt guard 12.

With reference to FIGS. 3 and 14, the round hole 52 slidably mounts within the slotted arcuate portion 20 of the belt guard 12. A bolt 74 is within the round hole 52 and extends through the arcuate portion 20. The shoulder portion of a shoulder nut 72 fits within the slotted arcuate portion 20 and seats within the radiused grooves 22. With reference to FIG. 14, preferably a washer 21 coated with Teflon®, further backed by a steel washer 23, fits between the shoulder nut 72 and belt guard 12. The purpose of this configuration is to prevent bending of the spring position adjuster assembly arm 42 and to provide improved slidability. The extended portion of the hex bolt 90 attaches the spring 30 at its second end 34 attaching location. Seating the shoulder nut 72 within the radiused grooves 22 allows the tension on the belt 70 and the force on the idler pulley 60 to be adjustable. An alternative embodiment has a cylindrical spacer 25 between the belt guard 12 and the Teflon® washer 21. The cylindrical spacer 25 aids in the movement from one radius groove 22 to the next radius groove 22.

Figure 4:
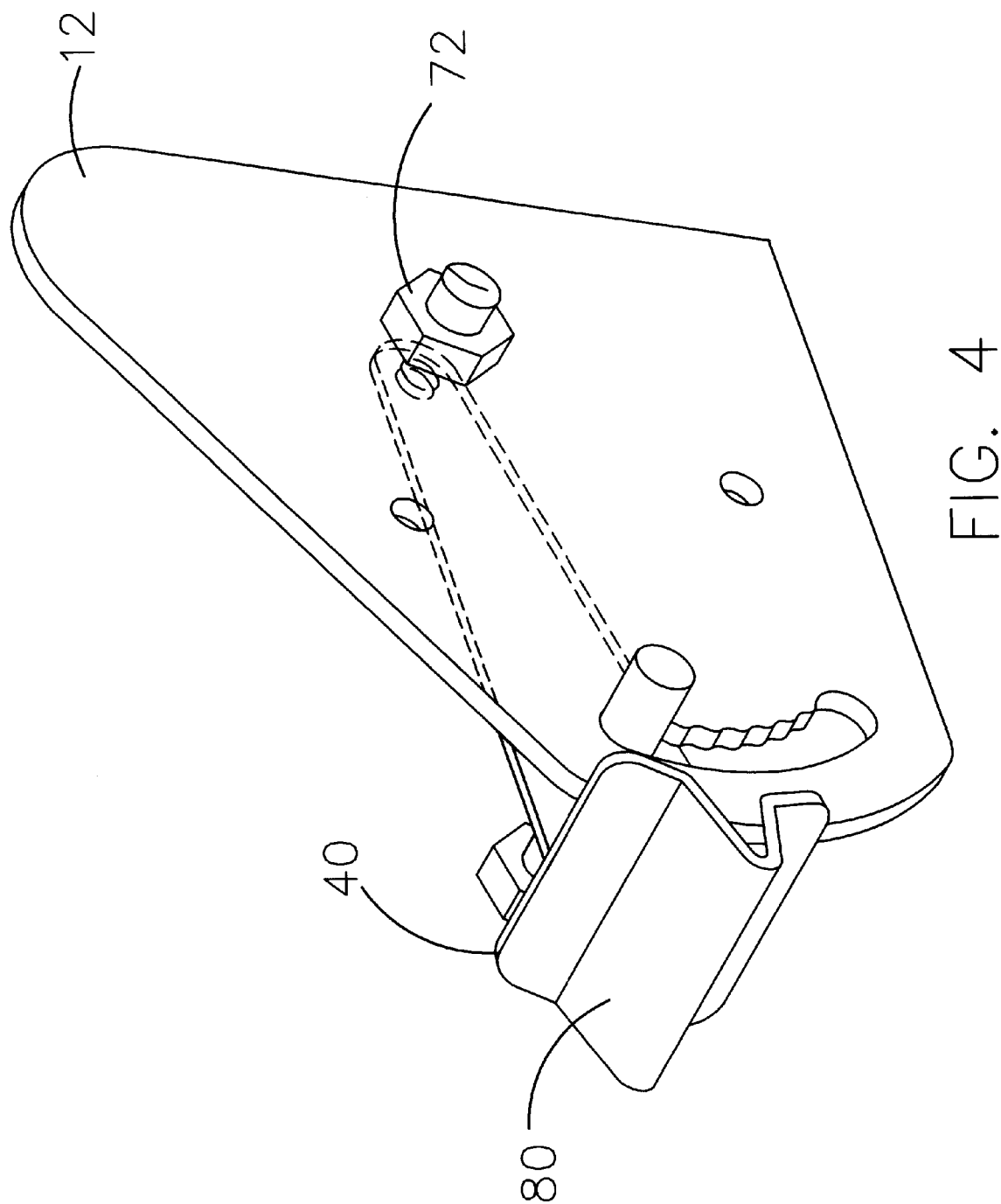
FIG. 4 is a perspective view of an alternative embodiment of the spring position adjuster assembly.

The body portion 48 extends into footstep end 54. An alternative embodiment of the spring position adjuster arm 40 is shown in FIG. 4. In this embodiment, the configuration does not feature a lever 46.

Figure 12:
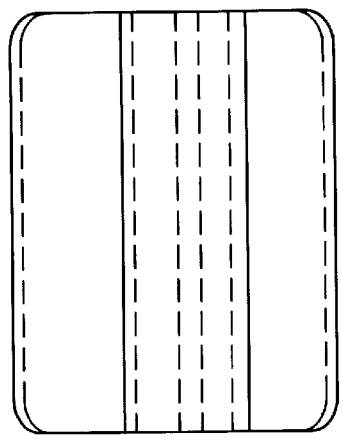
FIG. 12 is a top view of the spring position adjuster stop.
Figure 10:
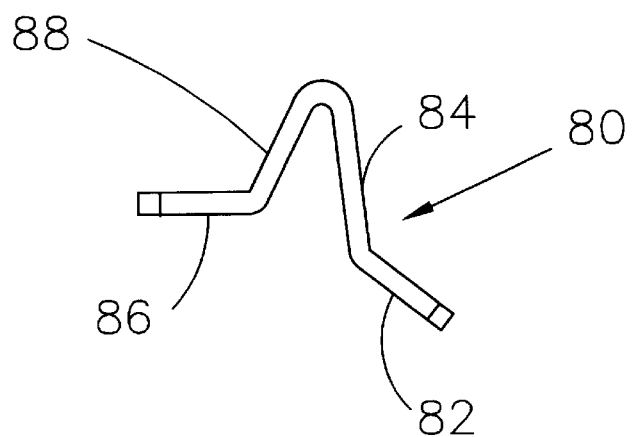
FIG. 10 is a front view of the spring position adjuster stop.
Figure 11:
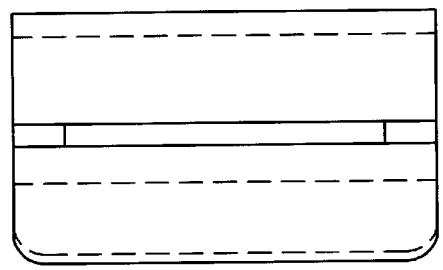
FIG. 11 is a side view of the spring position adjuster stop.

With reference to FIGS. 10–12, the footstep 80 has a flat portion 82 which mates against first surface 56 of footstep end 54. A flat portion 82 extends into a middle portion 84 which, in cross-section as shown in FIG. 10, resembles a "V", that thereafter extends into a flat angled portion 86. The footstep 80 is secured to the spring position adjuster arm 42 preferably by welding. Other attachment methods are within the scope of this invention. The spring position adjuster assembly 40 has been described thus far in its preferred embodiment; however, the spring position adjuster assembly 40 could be manufactured as one piece having a footstep 80 manufactured as the footstep end 54.

The footstep 80 allows the operator to increase the force on the idler pulley 60 and hence the belt tension with his foot, without using his hands. The operation of the adjustable belt-tensioning device 10 will now be explained. In wet environments or where the belt 70 is slipping due to wear, the operator can use the device 10 to increase the belt tension. As shown in FIG. 1, the operator can adjust the belt tension without the need for tools or for removing his hands from the steering handlebars. In the preferred embodiment, the operator uses his or her foot to push or kick the bottom portion 88 of the footstep 80 in a downward direction. This action causes the shoulder nut 72 and related parts, along with the spring position adjuster arm 42 to rotate downwardly within the slotted arcuate portion 20. This results in spring 30 being positioned such that more spring force is applied to the idler pulley 60, that is movable. The movement of pulley 60 pulls against belt 70 to stretch belt 70 thereby increasing the tension of the belt 70. The pulley 60 can therefore be moveably adjusted by the spring 30 to stretch the belt 70.

The belt-tensioning device 10 is adjustable by way of the slotted arcuate portion 20. The radiused grooves 22 within the slotted arcuate portion 20 allow for an infinite number of positions to increase the tension of the belt 70. It is believed the infinite number of positions along the slotted arcuate portion 20 provides a significant performance over a system incorporating discrete, limited positions along such a arcuate portion. In the latter case, belt tension is limited to a few discrete choices. However, the problems of belt wear and slippage due to wet conditions may not lend themselves to those specific discrete choices. In such cases, too much power might be supplied to the wheels making the mower more difficult to control and requiring more force. It is believed that the infinite number of positions to increase belt tension provides more precise and manageable control of the mower. In this configuration, the lower the footstep 80 is positioned, the greater the increase in idler force and hence, the greater tension within the belt 70. Where the operator realizes, whether through wear of the belts or through wet conditions such as rain, moisture, etc., that he or she will need an increase in the driving force of the mower, the operator is able to adjust the amount of tension within the belt 70 by using lever 46.

Using lever 46 is an alternative way to increase the tension of the belt 70. Lever 46 extends outward of the belt guard 12 so that the increase in tension of the belt 70 can be manipulated by hand also. By moving the lever 46 rearward in direction A, as shown in FIG. 3, the operator can increase belt tension in the same manner as lowering footstep 80.

Figure 13:
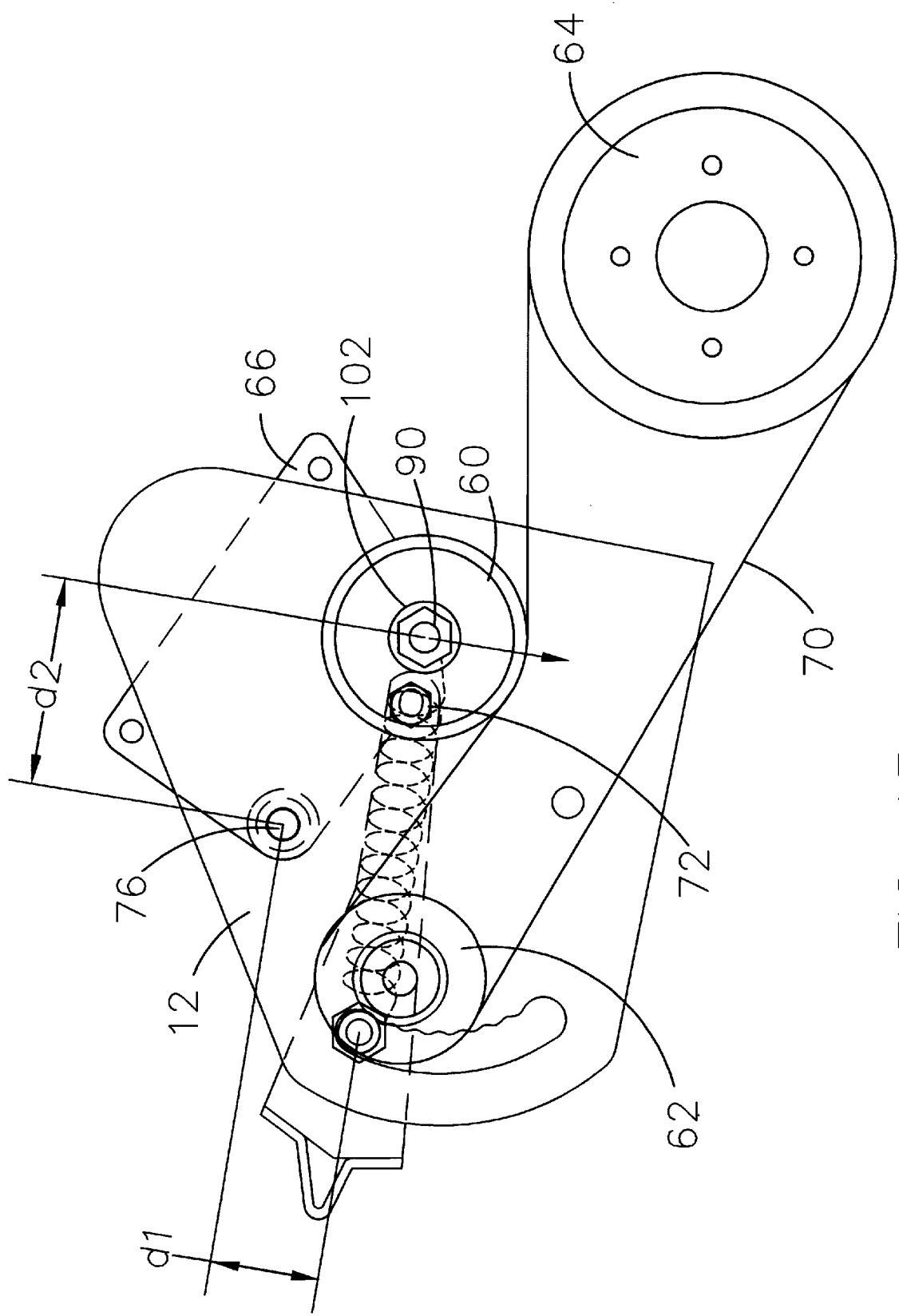
FIG. 13 shows the present invention having the idler force at its lowest position.

FIGS. 3 and 13 show the position where the idler force is at its highest and lowest, respectively. The force $F_i$ on the idler pulley 60 is a product of the spring force K, due to its extension, and the distance from the center of bolt 74 (first attachment point of the spring 30) to the bellcrank pivot 76 divided by the distance from the bellcrank pivot 76 to the center of the idler pulley 60. The distance from the center of bolt 74 to the bellcrank pivot 76 is denoted as $d_1$. The distance from the bellcrank pivot 76 to the center of idler pulley 60 is denoted as $d_2$. A summation of forces for equilibrium with respect to the bellcrank pivot 76 would yield the following, in formulaic terms:

$$K(\text{spring force}) \times d_1 = F_i \times d_2$$

and, $$F_i = K \times d_1 / d_2$$

When the spring position adjuster arm 42 is in its upwardmost position, as shown in FIG. 13, the spring 30 is close to the bellcrank 76. At this position, the idler force is at its lowest which is also the position where the engagement force on the lever 46 is at its lowest (not shown). At this position, the operator will be most comfortable since the handle engagement forces are at their lowest. "Handle engagement forces" means the force necessarily applied by the operator to control a typical commercial walk-behind mower. In such device, the operator must squeeze levers and hold them against tension in order to limit power to the wheels during maneuvers.

As the spring position adjuster assembly 40 is moved downward, as shown in FIG. 13 by arrow B, the spring 30 essentially is the same length. However, the distance from the spring 30 to the bellcrank pivot 76 is increased making the product of the spring force K and distance $d_1$ larger. Since the distance from the bellcrank pivot 76 to the center of the idler pulley 60 remains close to the original distance $d_2$, the force on the idler is therefore increased. At the same time, the engagement force on the handles of the mower is also increased. Traction at this position is increased due to the increase in idler force.

The preferred embodiments have been described above. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. An adjustable tensioning device in combination with a walk-behind mower having a frame, comprising:

a bellcrank bracket, said bellcrank bracket pivotally mounted to the frame of the walk-behind mower;

a drive, a driven, and an idler pulley, said idler pulley mounted to said bellcrank bracket by a mounting means;

a belt, said belt riding within said drive, driven and idler pulleys, said idler pulley exerting a force upon said belt, when in use said belt being under tension;

a belt guard, said belt guard having a slotted portion and a hole, said slotted portion having a first side and a second side;

a spring position adjuster assembly, said adjuster assembly having an arm and a footstep, said spring position adjuster arm pivotally mounted to said belt guard through a slotted hole in said spring postion adjuster arm, said spring position adjuster assembly able to move upwardly and downwardly;

engaging means, said, engaging means engaging said spring position adjuster arm with said slotted portion of said belt guard;

a spring, said spring having a first and second end, said first end of said spring attached to said spring position adjuster arm, said second end of said spring attached to said mounting means; and whereby said belt force is increased by movement of said spring position adjuster assembly in the downward direction.

2. The adjustable tensioning device as recited in claim 1 wherein movement of said spring position adjuster assembly in the downward direction increases said force of said idler pulley and increases the tension of said belt.

3. The adjustable tensioning device as recited in claim 2 wherein said slotted portion of said belt guard has grooves along said first side.

4. The adjustable tensioning device as recited in claim 2 wherein said engaging means comprises a bolt.

5. The adjustable tensioning device as recited in claim 3 wherein said engaging means comprises a bolt, said bolt able to move within said slotted portion of said belt guard, said bolt able to seat within said grooves of said belt guard.

6. The adjustable tensioning device as recited in claim 2 wherein the tension of said belt is increased due to an increase in a force on said idler pulley.

7. The adjustable tensioning device as recited in claim 1 wherein said spring position adjuster arm and said footstep are an integral piece.

8. An adjustable tensioning device in combination with a walk-behind mower having a frame, comprising:

bellcrank bracket, said bellcrank bracket pivotally mounted to the frame of the walk-behind mower;

a drive, a driven, and an idler pulley, said idler pulley mounted to said bellcrank bracket by a mounting means, said idler pulley subjected to a force;

a belt, said belt riding within said drive, driven and idler pulleys, said belt having a tension, said idler pulley exerting a force upon said belt;

a belt guard said belt guard having a slotted portion and a hole, said slotted portion having an first side and an second side;

a spring position adjuster assembly, said adjuster assembly having an arm and footstep, said spring position adjuster arm having a lever, said spring position adjuster arm pivotally mounted to said belt guard through a slotted hole in said spring position adjuster arm;

engaging means, said engaging means engaging said spring position adjuster arm with said slotted portion of said belt guard;

a spring, said spring having a first and second end, said first end of said spring attached to said spring position adjuster arm, said second end of said spring attached to said mounting means.

9. The adjustable tensioning device as recited in claim 8 wherein movement of said lever in a rearward direction increases the tension of said belt.

10. The adjustable tensioning device as recited in claim 8 wherein movement of said lever in downward direction increases said force of said idler pulley and increases the tension of said belt.

11. The adjustable tensioning device as recited in claim 10 wherein said slotted portion of said belt guard has grooves along said first side.

12. The adjustable tensioning device as recited in claim 10 wherein said engaging means comprises a bolt.

13. The adjustable tensioning device as recited in claim 12 wherein said engaging means comprises a bolt, said bolt able to move within said slotted portion of said belt guard, said bolt able to seat within said grooves of said belt guard.

14. The adjustable tensioning device as recited in claim 10 wherein the tension of said belt is increased due to an increase in a force on said idler pulley.

15. The adjustable tensioning device as recited in claim 8 wherein said spring position adjuster arm and said footstep are an integral piece.

* * * * *